United States Patent
Ramsden-Pogue et al.

(10) Patent No.: US 8,972,604 B1
(45) Date of Patent: Mar. 3, 2015

(54) NETWORK ADDRESS RETENTION AND ASSIGNMENT

(75) Inventors: Joshua D. Ramsden-Pogue, Seattle, WA (US); Mario Paul Edward Popish, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 104 days.

(21) Appl. No.: 13/588,878

(22) Filed: Aug. 17, 2012

(51) Int. Cl.
*G06F 15/16* (2006.01)

(52) U.S. Cl.
USPC ........................................................ 709/245

(58) Field of Classification Search
CPC ............... H04L 29/12066; H04L 29/12301; H04L 61/1511; H04L 61/2076; H04L 67/1095
USPC ................................................ 709/245, 238
See application file for complete search history.

(56) References Cited

U.S. PATENT DOCUMENTS

| | | | |
|---|---|---|---|
| 6,381,650 B1 * | 4/2002 | Peacock | 709/245 |
| 2009/0094379 A1 * | 4/2009 | Lu et al. | 709/238 |
| 2009/0327098 A1 * | 12/2009 | Ronen et al. | 705/26 |
| 2014/0006641 A1 * | 1/2014 | James et al. | 709/245 |

FOREIGN PATENT DOCUMENTS

WO       WO 0057611 A3 *  12/2000

* cited by examiner

*Primary Examiner* — Kostas Katsikis
(74) *Attorney, Agent, or Firm* — Lee & Hayes, PLLC

(57) ABSTRACT

A network-based services platform is configured to dynamically allocate network addresses to requesting machine instances. When a particular address becomes unassigned, it may be retained, and not allowed to be reassigned, during a period of time in which it is expected that the unassigned address may continue to be the target of outdated DNS records.

17 Claims, 3 Drawing Sheets

NETWORK ADDRESS RETENTION AND ASSIGNMENT

BACKGROUND

Large-scale, network-based computing represents a paradigm shift from traditional client-server computing relationships. With large-scale, network-based service platforms (e.g., data centers), customers are able to leverage shared resources on demand by renting resources that are owned by third parties and that reside "in the cloud." With these resources, customers of the platform are able to launch and maintain large applications without actually owning or servicing the underlying infrastructure necessary for these applications. As a result, network-based service platforms have expanded the class of individuals and companies able to effectively compete in the realm of computing applications.

A network application typically comprises one or more computer instances, each of which may be a physical instance or a virtual instance. As physical and/or virtual computers are instantiated or allocated, they are associated with numeric network addresses. As an example, network addresses may comprise Internet Protocol Version 4 (IPv4) addresses, which consist of a set of four octets in the format xxx.xxx.xxx.xxx.

In a network-based service platform, computer instances, also referred to as machine instances, may be dynamically created and destroyed. For example, an existing instance may be destroyed and replaced by a new instance. However, the new instance may be assigned a network address that is different than the network address of the instance that has just been destroyed.

The Internet uses a public network naming resolution service, referred to as the domain naming system (DNS), so that requesting clients may reference network entities by descriptive domain names rather than by numeric addresses. Thus, when a machine instance of a network application is replaced, resulting in a different numeric network address, the DNS system may be updated with the new network address so that future communications to a particular domain name are directed to the correct network address.

Unfortunately, DNS updates tend to propagate very slowly through the DNS system, and take can as long as 24 hours to fully propagate. In the meantime, a network name may continue to be associated with its old numeric address, and network requests to that address may be unfulfilled. Even worse, situations may arise in which the old address is assigned to an instance of a different customer within a network-based service platform, resulting in network requests being misdirected to network applications or sites that are unrelated to the original request.

Although mechanisms are available for dealing with this issue, such mechanisms typically require a degree of forethought and planning. In many situations, customers of network-based service platforms fail to recognize this potential issue until a problem arises, when there are few solutions other than waiting for full DNS propagation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for implementing applications and services in conjunction with network-accessible services such as offered by a network-based services platform. Network-based services platforms offer a variety of scalable resources, including computational capacity, memory, and functionality.

When designing an application that is to be implemented by network-accessible services, a developer may specify one or more computer or machine instances, which may comprise physical machine instances and/or virtual machine instances. Upon creation, a machine instance is assigned or associated with a network address such as a numeric Internet Protocol (IP) address.

A services platform may maintain a pool of unassigned network addresses, and may assign network addresses from this address pool to requesting machine instances. From time to time, previously assigned addresses may be reclaimed or unassigned, such as when a machine instance is destroyed. When a network address is reclaimed or becomes unassigned, it is added back to the pool of unassigned network addresses, and may be assigned to newly created machine instances.

In many situations, a customer will configure public domain name services (DNS) so that a particular domain name is directed to an assigned IP address, even though there is no guarantee that the IP address will be assigned indefinitely to the customer or the customer's machine instances. Subsequently, when a situation arises in which one of more of the customer machine instances are assigned different IP addresses, domain name services may supply incorrect numeric addresses.

In certain embodiments described herein, one or more addresses of the unassigned address pool are identified as being potentially the subject of invalid, outdated, or incorrect references or requests by other network entities. These one or more addresses are reserved or retained, and are not assigned to new computer instances. As an example, reclaimed network addresses may be retained after being reclaimed for a period equal to or greater than the maximum expected latency of DNS propagation. As another example, the services platform may query DNS systems to determine whether any of the currently unassigned IP addresses are referenced by active DNS records. If so, such IP addresses may be retained and withheld when assigning network addresses to new or renewing machine instances.

In addition, the services platform may intercept network requests to the retained addresses, which are assumed to be the result of outdated DNS records, and may forward or redirect the requests to machine instances that have replaced recently destroyed instances.

Figure 1:
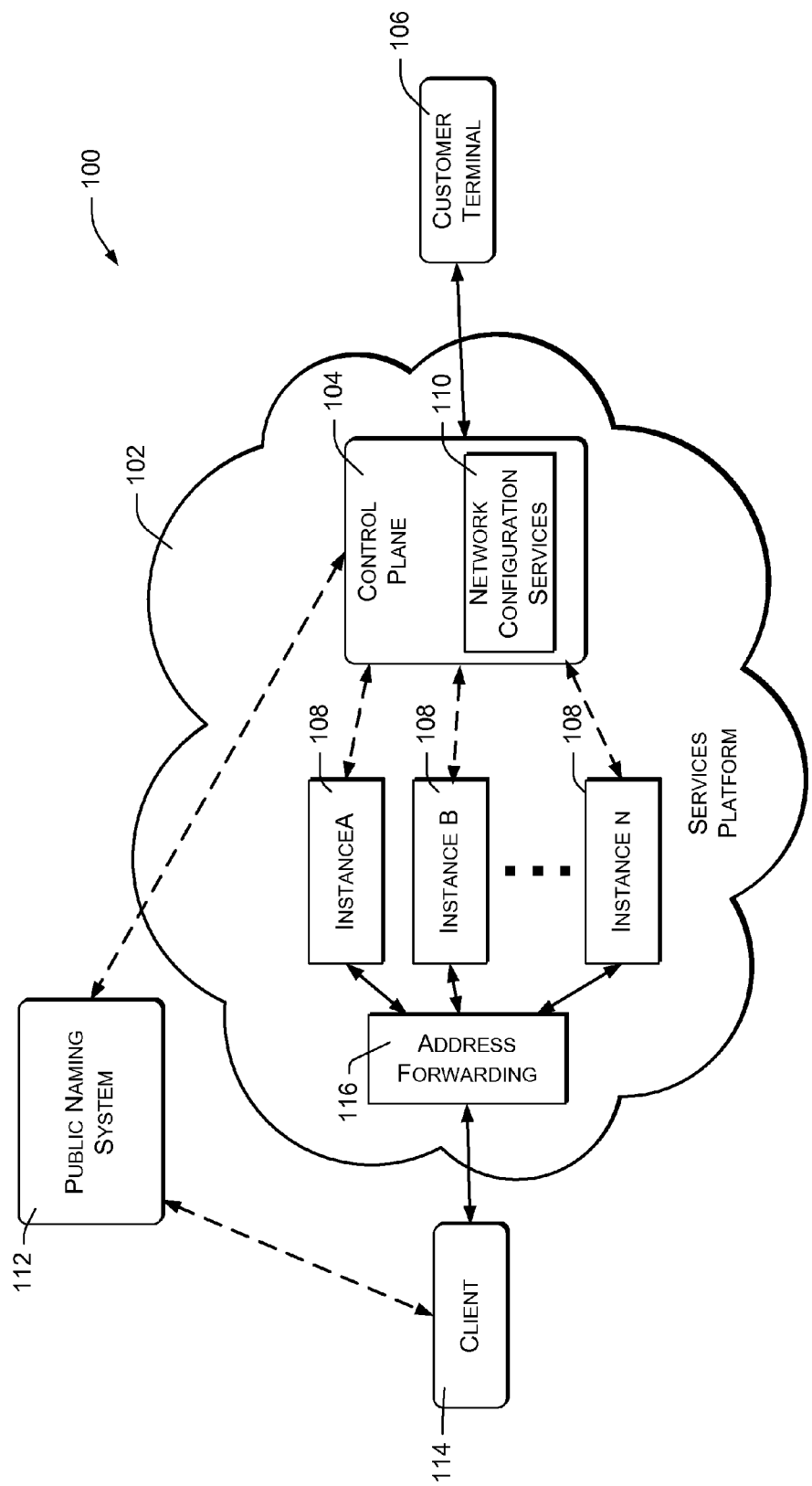
FIG. 1 is a block diagram illustrating an example environment within which network-based applications and machine instances may be assigned network addresses in accordance with techniques described herein.

FIG. 1 illustrates an environment 100 in which these techniques may be implemented. The environment of FIG. 1 includes a network-based platform or services provider 102, which may provide resources and functionality. The network-based platform 102 may be referred to as Infrastructure as a Service (IaaS) and/or Platform as a Service (PaaS). The network-based services platform 102 may implement services with dedicated servers, shared servers, virtual servers, server slices, processors, processor cycles, storage, memory, and so forth. Generally, the network-accessible services are available in scalable increments or amounts, which can be dynamically increased or decreased in response to usage and/or demand. Service fees may be tied to the amount of the resources that are actually used.

System management of the services platform 102 may be characterized as one or more control components 104 that are also referred to collectively as a control plane 104. Customers of the services platform may interact with the control plane 104 through a customer terminal 106 to configure applications, such as to request and configure machine instances 108. In addition, the control plane 104 supervises the machine instances 108, provides networking services, provides maintenance and diagnostic services, and so forth. The customer terminal 106 may comprise a computer, terminal, or other similar type of device that communicates with the platform 102 over a network such as the Internet.

The control plane 104 may include network configuration services 110 such as dynamic host configuration protocol (DHCP) services or similar types of services that allocate or assign network addresses to computer instances as they boot. The network configuration services 110 may maintain a pool of public and/or private IP addresses that are allocated or assigned to computer instances upon request. IP addresses may be reclaimed by the network configuration services in certain situations, and added back to the pool. For instance, addresses may be reclaimed when a machine instance is terminated, destroyed, removed, or replaced.

A customer application may comprise a number of machine instances 108, each of which may have public and/or private network addresses. Public network addresses used by the machine instances 108 may be registered with a public naming system 112 such as the DNS services that are commonly used in conjunction with the Internet. DNS is a distributed system of servers that maintain mappings of computer or domain names to numeric network addresses. Client machines and devices, referred to as hosts, typically query one or more DNS servers in order to resolve domain names into their corresponding numeric addresses. As an example, a computer or domain name such as "mydomain.com" may be mapped by the public naming system 112 into a numeric address such as "172.16.56.240".

Users of applications hosted by the services platform 102 may access the machine instances 108 of an application through client entities, devices, or browsers 114. In many situations, a user specifies a web site or other network resource in terms of a domain or domain name. The client entity 114 in turn references the naming system 112 to find a corresponding numeric network address, and then uses the network address to form a request to the appropriate machine or server instance 108.

In the environments of many services platforms 102, situations arise in which a machine instance 108 may be replaced, reconfigured, recreated, or reinitialized in such a way that its network address changes. This may happen during scheduled or routine maintenance, as part of application upgrades, or as a result as a result of troubleshooting or disaster recovery efforts.

As an example, the instance "A" may be initially instantiated and may receive a first network address from the network configuration services 110. At some point, for various reasons, the instance "A" may be destroyed and recreated, or may be replaced by a newly created machine instance. The new machine instance "A" may request a network address from the network configuration services 110, but may receive a network address that is different than the network address that was previously assigned to the instance "A". This may cause the previously configured name mappings of the public naming system 112 to become outdated or inaccurate, and in turn may cause client requests to become lost or misrouted. The public naming system 112 may be updated to account for this situation, but updates may take a relatively long time to become effective.

To address this situation, in which DNS information points to an incorrect or nonexistent machine instance within the services platform 102, the network configuration services 110 implements certain measures with respect to network addresses that are reclaimed from machine instances that have been or are being destroyed. These measures include identifying any currently unassigned network addresses that may remain the subject or target of DNS mappings or records, and retaining such addresses so that they are not newly assigned to requesting machine instances. For example, reclaimed addresses may be retained or reserved for a period of time after being reclaimed before they are again assigned to new machine instances, allowing sufficient time for correctively updating DNS systems.

In addition, the platform services 102 may implement an address forwarding service 116 that forwards incorrectly addressed communications to the machine instances 108 to which they were originally intended. Alternatively, the functionality of the address forwarding service 116 may be implemented by or within the instances 108 themselves, rather than as a separate logical component.

Figure 2:
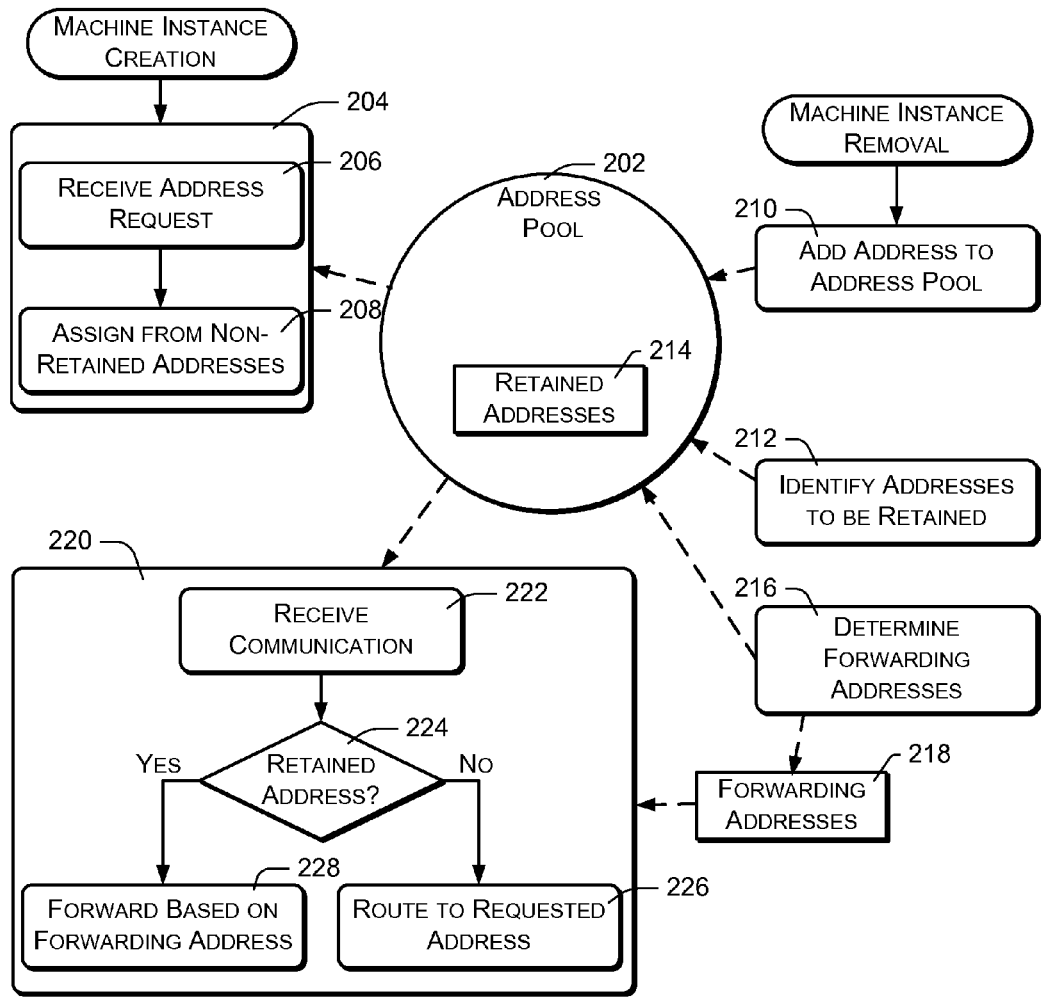
FIG. 2 is a flow diagram illustrating network address handling in accordance with the techniques described herein.

FIG. 2 shows example processes that may be implemented by the platform services 102, by the network configuration services 110, and/or by the address forwarding service 116. The processes may be implemented by the architectures described herein, or by other architectures. These processes are illustrated as collections of blocks in logical flow graphs. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

The network configuration services 110 may maintain a network address pool 202 of network addresses to be assigned to requesting machine instances 108 within the services platform 102. The network addresses may be Internet Protocol (IP) addresses, and may comprise public or private addresses.

FIG. 2 illustrates an example process or method 204 that is performed by the network configuration services 110 when a machine instance 108 is created or renewed. The process or method 204 comprises an action 206 of receiving an address request from the machine instance 108. For example, a newly instantiated machine may provide a dynamic host configuration protocol (DHCP) request, which is received by the network configuration services 110 of the services platform 102. In response, the network configuration services 110, which may include a DHCP server, performs an action 208 of assigning a network address to the requesting machine instance 108. When performing this assignment, the address is assigned from available addresses of the address pool 202 that have not been retained, as will be described in more detail below.

FIG. 2 further illustrates an action 210 that is performed by the network configuration services 110 when a machine instance is removed, deleted or destroyed from the services platform 102. The action 210 comprises adding the previously assigned network address of the destroyed instance to the address pool 202. This may be referred to as reclaiming or unassigning the address.

The network configuration services 110 may additionally perform an action 212, comprising identifying certain addresses of the address pool 202 as reserved or retained. A particular address is identified as reserved or retained when it is potentially being targeted by a domain name registry or other network name resolution service.

The action 212 may be performed in various ways. In some implementations, addresses that are reclaimed may be retained for a fixed period of time, such as 24 hours, under the conservative assumption that any reclaimed address is potentially the subject of incorrect DNS mappings for at least some period of time. Alternatively, DNS systems may be explicitly queried, using reverse look-up techniques, to determine whether any particular network address of the pool 202 remains the target or subject of an existing DNS record.

The action 212 may alternatively be performed by monitoring and evaluating incoming network communications addressed to the unassigned network addresses. For example, it may be assumed in some cases that the continued reception of incoming communications to a particular network address is an indication that the network address is currently the subject of one or more active DNS records. If that network address is currently unassigned, it may be assumed that the DNS records are out of date and incorrect. Accordingly, the action 212 may comprise determining whether a communication addressed to a particular unassigned network address has been received within a preceding time period of a predetermined duration.

In addition, or alternatively, incoming communications themselves may be examined or inspected to determine changes or inconsistencies in header information—such as by inspecting the host header of a communications packet.

The address pool 202 may include a plurality of retained addresses 214, which have been identified by the action 212. As mentioned above, the address assignment action 208 is performed from non-retained addresses, so that retained addresses 214 are not assigned to newly created machine instances.

The actions described thus far allow the network configuration services 110 to avoid assigning network addresses that are potentially the subject of active DNS mappings. Note that any existing DNS record indicating one of the unassigned addresses of the address pool 202 may be considered an incorrect or out-of-date entry—DNS entries should not normally point to network addresses that have been reclaimed and that have not been reassigned.

By temporarily avoiding the reassignment of any network addresses that are potentially the subject of incorrect DNS mappings, the services platform is able to reduce or minimize the erroneous routing of incoming communications based on network addresses that have become unassigned. However, such incoming communications may nevertheless fail to reach their intended destinations, because the communications specify network addresses that do not correspond to existing machine instances.

To address this potential issue, the network configuration services 110 may perform an action 216 of determining forwarding addresses 218 corresponding to certain of the retained addresses. For example, the network configuration services 110 may keep track of machine instances that are replaced or renewed, and may also keep track of old and new network addresses for such instances. Thus, the network configuration services 110 may identify forwarding addresses 218 for one or more of the retained addresses 214, although it may be unable to determine such forwarding addresses 218 for all of the retained addresses 214.

The action 216 may also, or alternatively, be performed by querying authoritative DNS servers to obtain up-to-date name mapping information. For example, the network configuration services 110 may initially query DNS services to determine the domain name associated with a particular network address. Subsequently, when that network address has been reclaimed and retained, the network configuration services 110 may again query the DNS services to identify any new network address that has been associated with the same domain name. Future communications that specify the old (and reclaimed) network address may then be forwarded to the new network address.

FIG. 2 illustrates an example process or method 220 that may be performed by the address forwarding service 116 of FIG. 1, or by similar functionality implemented by individual machine instances or by other components or elements of the services platform 102. At 222, the address forwarding service 116 receives an incoming communication, specifying a recipient network address. An action 224 comprises determining whether the recipient address is one of the retained addresses 214. If not, an action 226 is performed of routing the communication based on the specified recipient address. If the recipient address is one of the retained addresses 214, however, an action 228 is performed of forwarding the communication based on the forwarding address, if such a forwarding address is known. More specifically, the communication is redirected to the forwarding address 218 that has been previously associated with the recipient address by the action 216.

The forwarding 228 may comprise directly routing the incoming communication to a forwarding address, or may alternatively comprise returning a redirect response to the sender of the communication, indicating the forwarding address. For example, the forwarding 228 may comprise returning an HTTP (hypertext transfer protocol) response status code 301, indicating the forwarding address.

Figure 3:
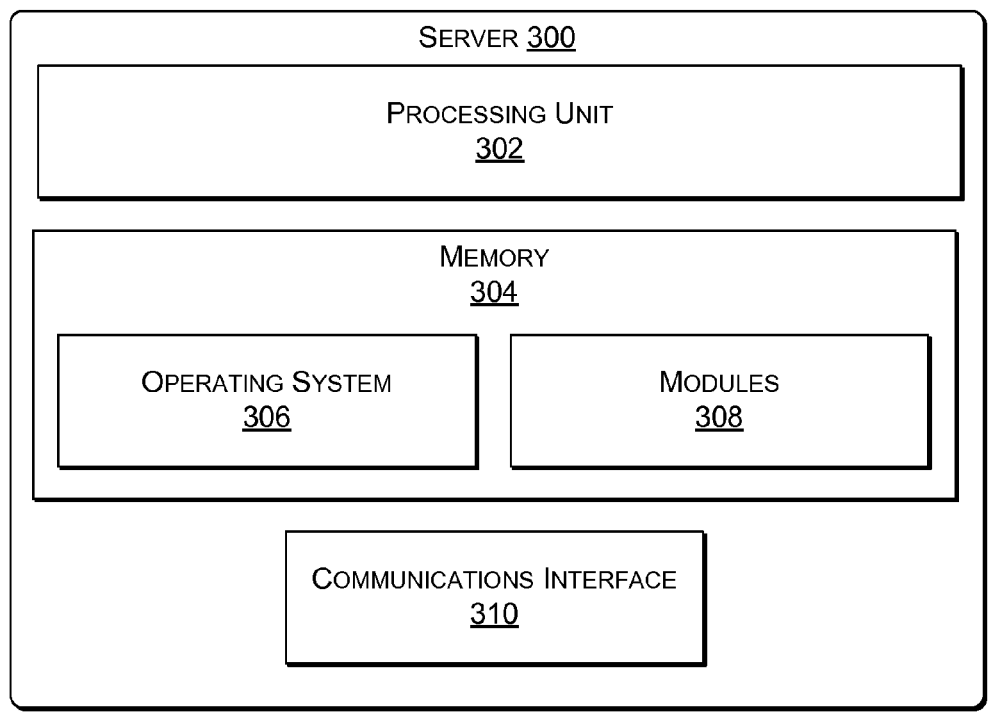
FIG. 3 is a block diagram showing high-level components of a server that may be used to implement the network-based services platform shown in FIGS. 1 and 2.

FIG. 3 illustrates relevant components of a server 300 that may be used to implement the functionality of the network-based services platform 102. Generally, such platform functionality may be implemented by one or more servers or similar devices, with the various actions described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 300 might comprise a processing unit 302 composed one of one or more processors, and memory 304. The memory 304 may comprise computer storage media and may include volatile and non-volatile memory. Thus, the memory 304 may include, but is not limited to, RAM, ROM, EEPROM, flash memory, or other memory technology, or any other medium which can be used to store media items or applications and data which can be accessed by the server 300.

The memory 304 may be used to store functional components, such as programs and program modules, which are executable on the processing unit 302. Thus, the memory 304 may store an operating system 306 as well components, modules, and/or logic 308 for performing the actions attributed above to the network-based services platform 102.

The server 300 may also have a communications interface 310, such as a wired or wireless network interface, for communicating with various clients and other network entities.

The server 300 may of course include many other logical, programmatic, and physical components, of which those shown in FIG. 3 are merely examples that are related to the discussion herein. Thus, the server 300 may include communications interfaces, storage devices, input/output components, and so forth.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
    classifying one or more network addresses as being at least one of potentially targeted by a domain name registry or not potentially targeted by the domain name registry, wherein the classifying comprises determining that the one or more of the network addresses have been unassigned from computer instances within a preceding time period, and wherein the classifying comprises querying the domain name registry to determine whether the one or more network addresses is targeted;
    assigning network addresses to requesting computer instances from the one or more network addresses that are classified as not potentially targeted by the domain name registry;
    determining a forwarding network address for at least one network address classified as potentially targeted by the domain name registry by querying one or more domain name registries; and
    in response to receiving a network communication addressed to the at least one network address, forwarding the communication based on the forwarding network address determined for the at least one network address.

2. The one or more non-transitory computer-readable media of claim 1, wherein the classifying comprises inspecting a host header of the network communication.

3. The one or more non-transitory computer-readable media of claim 1, wherein the classifying comprises determining whether a communication addressed to the one or more network addresses has been received within a preceding time period of a predetermined duration.

4. The one or more non-transitory computer-readable media of claim 1, wherein the classifying comprises inspecting the network communication to determine whether a particular one of the one or more network addresses is targeted.

5. A method, comprising:
    maintaining a pool of unassigned network addresses for assignment to requesting computer instances;
    identifying one of the unassigned network addresses as potentially being referenced by a network entity, wherein the identifying comprises determining that the one of the unassigned network addresses has been unassigned from computer instances within a preceding time period, and wherein the identifying comprises querying one or more domain name registries to determine whether the one of the unassigned network addresses is potentially being referenced by a network entity;
    determining a forwarding network address corresponding to the identified one of the unassigned network addresses by querying one or more domain name registries; and
    in response to receiving a communication addressed to the identified one of the unassigned network addresses, forwarding the communication based on the determined forwarding network address.

6. The method of claim 5, wherein an unassigned network address is identified as potentially being referenced by a network entity if it is publically associated with a domain name.

7. The method of claim 5, wherein an unassigned network address is identified as potentially being referenced by a network entity if communications addressed to the unassigned address are being received.

8. The method of claim 5, wherein an unassigned network address is identified as potentially being referenced by a network entity if a communication addressed to the unassigned network address has been received within a preceding period of a predetermined duration.

9. The method of claim 5, further comprising, in response to receiving a request from a computer instance for address assignment, assigning to the computer instance one of the unassigned addresses that has not been identified as potentially being referenced by a network entity.

10. The method of claim 5, wherein the identifying comprises querying a network name resolution service.

11. The method of claim 5, wherein an unassigned network address is identified as potentially being referenced by a network entity if it is referenced by a public domain name service (DNS).

12. One or more computing devices comprising:
    one or more processors; and
    memory, accessible by the one or more processors and storing instructions that are executable by the one or more processors to perform acts comprising:
        maintaining a pool of unassigned network addresses for assignment to requesting computer instances;
        identifying one of the unassigned network addresses as potentially being referenced by a network entity, wherein the identifying comprises determining that the one of the unassigned network addresses has been unassigned from computer instances within a preceding time period, and wherein the identifying comprises querying one or more domain name registries to determine whether the one of the unassigned network addresses is potentially being referenced by a network entity;

determining a forwarding network address corresponding to the identified one of the unassigned network addresses by querying one or more domain name registries; and in response to receiving a request from a computer instance for address assignment, assigning one of the unassigned addresses that has not been identified as potentially being referenced by a network entity.

13. The one or more computing devices of claim 12, wherein the identifying comprises querying a network name resolution service.

14. The one or more computing devices of claim 12, wherein an unassigned network address is identified as potentially being referenced by a network entity if it is referenced by a public domain name service (DNS).

15. The one or more computing devices of claim 12, wherein an unassigned network address is identified as potentially being referenced by a network entity if it is publically associated with a domain name.

16. The one or more computing devices of claim 12, wherein an unassigned network address is identified as potentially being referenced by a network entity if a communication addressed to the unassigned network address has been received within a preceding period of a predetermined duration.

17. The one or more computing devices of claim 12, the acts further comprising;

in response to receiving a communication addressed to the identified one of the unassigned network addresses, forwarding the communication based on the determined forwarding network address.

* * * * *